Oct. 25, 1932.  E. J. LEES  1,883,995

THREAD MILLING MACHINE

Filed Aug. 20, 1929  5 Sheets-Sheet 1

INVENTOR
Ernest J. Lees
Slough and Canfield
ATTORNEY

Oct. 25, 1932.  E. J. LEES  1,883,995
THREAD MILLING MACHINE
Filed Aug. 20, 1929   5 Sheets-Sheet 2

INVENTOR
Ernest J. Lees
BY
Slough and Canfield
ATTORNEY

Oct. 25, 1932.  E. J. LEES  1,883,995
THREAD MILLING MACHINE
Filed Aug. 20, 1929   5 Sheets-Sheet 3

INVENTOR
Ernest J. Lees
BY
Slough and Canfield
ATTORNEY

Oct. 25, 1932.  E. J. LEES  1,883,995
THREAD MILLING MACHINE
Filed Aug. 20, 1929   5 Sheets-Sheet 5

Fig. 10

Inventor
Ernest J. Lees
By Slough and Canfield
Attorney

Patented Oct. 25, 1932

1,883,995

UNITED STATES PATENT OFFICE

ERNEST J. LEES, OF CLEVELAND, OHIO, ASSIGNOR TO THE LEES-BRADNER COMPANY, OF CLEVELAND, OHIO, A CORPORATION OF OHIO

THREAD MILLING MACHINE

Application filed August 20, 1929. Serial No. 387,222.

This invention relates to machine tools and particularly to machine tools for performing a number of different operations on the same work piece and more particularly relates to machine tools for performing the operations of end facing and thread milling.

One of the objects of this invention is to provide a machine and method for cutting threads, in an improved manner, by means of a multi-ring type cutter.

Another object is to provide a method and means for milling threads externally or internally of a work piece and on a generally conical surface thereof.

Another object is to provide a method and means for milling threads on conical surfaces to a higher degree of accuracy than heretofore attainable.

Another object is to provide a method and means for milling threads on conical surfaces whereby the positional relation of the beginning and end of the thread along the axis of the cone may be accurately determined.

Another object is to provide a method and means for milling threads on the conical surfaces of bodies having end faces or shoulders against which mating threaded portions are to be abuttingly joined in practice and whereby the position of the beginning and end of the thread along the axis of the work piece relative to the end face or shoulder may be accurately determined.

Another object is to provide a thread milling machine of the type in which the lead of the tool with respect to the work is effected by a gear driven lead screw and in which the prevention of "back lash" in the gearing between sucessive threading operations is effected in an improved manner.

Another object is to provide in a thread milling machine of the class referred to an improved means for propelling the lead screw.

Another object is to provide in a thread milling machine of the class referred to an improved means for transmitting power from the power source to the lead screw.

Another object is to provide in a machine adapted to perform an operation on a work piece along a line at an angle to the axis of the work piece, an improved means for guiding the tool along the said line.

Another object is to provide in a machine for cutting threads on conical surfaces an improved means for giving lead movement to the tool along a line at an angle to the axis of the work.

Another object is to provide in a machine adapted to operate on a work piece on a line at an angle to the axis of the work and of the type in which the tool may be fed relative to the work transversely of its axis, an improved means for adjustably feeding the tool and for eliminating lost motion in the guiding of the tool along said angular line.

Another object is to provide in a machine in which the tool may be given a longitudinal movement relative to the work to position it before operation thereon, an improved means for accurately so positioning the tool.

Another object is to provide a machine adapted to perform a facing operation on a work piece, and in which a tool for performing a second operation such as thread milling or the like is adapted to be placed for engagement with the work in positional relation to said faced portion, and having means for accurately so positioning the tool for the second operation.

Another object is to provide an improved machine and method for accurately cutting threads by a milling cutter generally.

Another object is to provide a thread milling machine in which lead movement is given to the tool support or carriage by means of a longitudinally traveling lead screw and by a clutch device adapted to connect and disconnect the tool support or carriage with the screw.

Another object is to provide, in a thread milling machine, improved means generally for propelling the tool support with a lead movement concurrently with the rotary movement of the work supporting spindle.

Another object is to provide in a machine tool in which the tool may be given longitudinal movement relative to the work to position it before operation thereon, means whereby the tool may be adjustably floated back and forth through the desired predetermined accurate position to positions beyond and to positions short of said position in attaining said position and in which these movements of the tool may be visibly indicated on a suitable indicator.

Another object is to provide a thread milling machine of the type in which relative lead movement is set up between a work support and a tool support for a thread milling operation by the tool on the work, and in which the relative lead movement is effected by a longitudinally travelling lead giving element, and a clutch device adapted to connect and disconnect the lead giving element to or from the movable tool support (or work support) and by a movable element anchored on the machine against movement thereon in the lead direction and engaged with the lead giving element for moving it.

My invention is fully disclosed in the following description taken in connection with the accompanying drawings, in which:—

Fig. 9 is a partial sectional view taken from the plane 9 of Figs. 1, 4 and 5;

In the drawings:—

Figure 1:
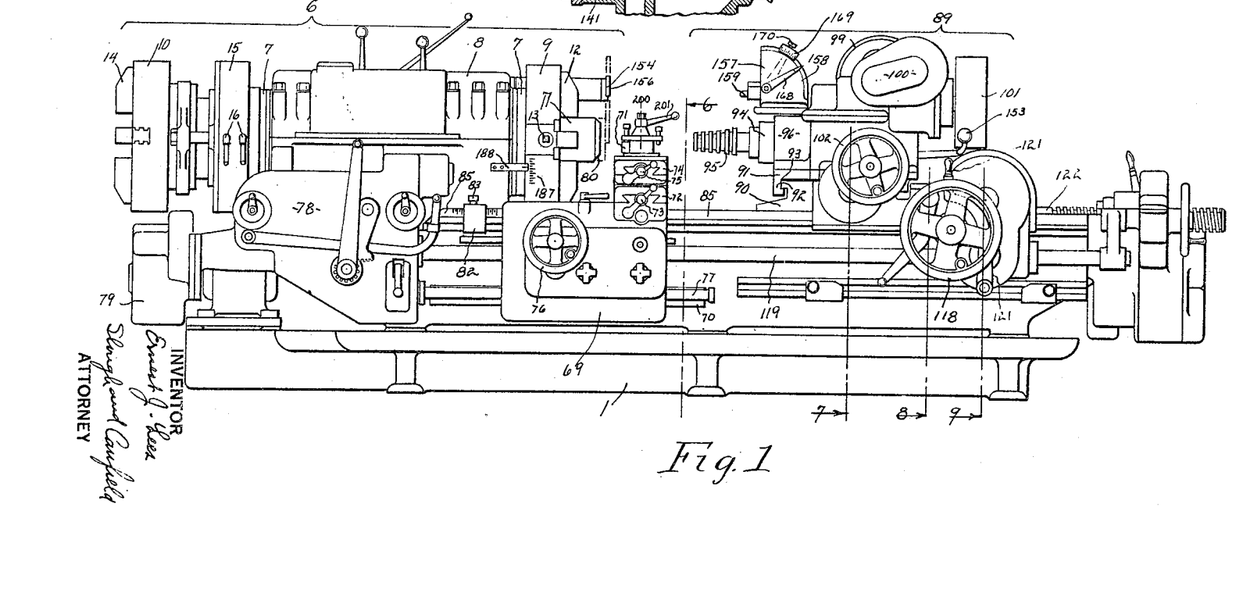
Fig. 1 is a front elevational view of a machine embodying my invention.
Figures 4, 7, 8, 14:
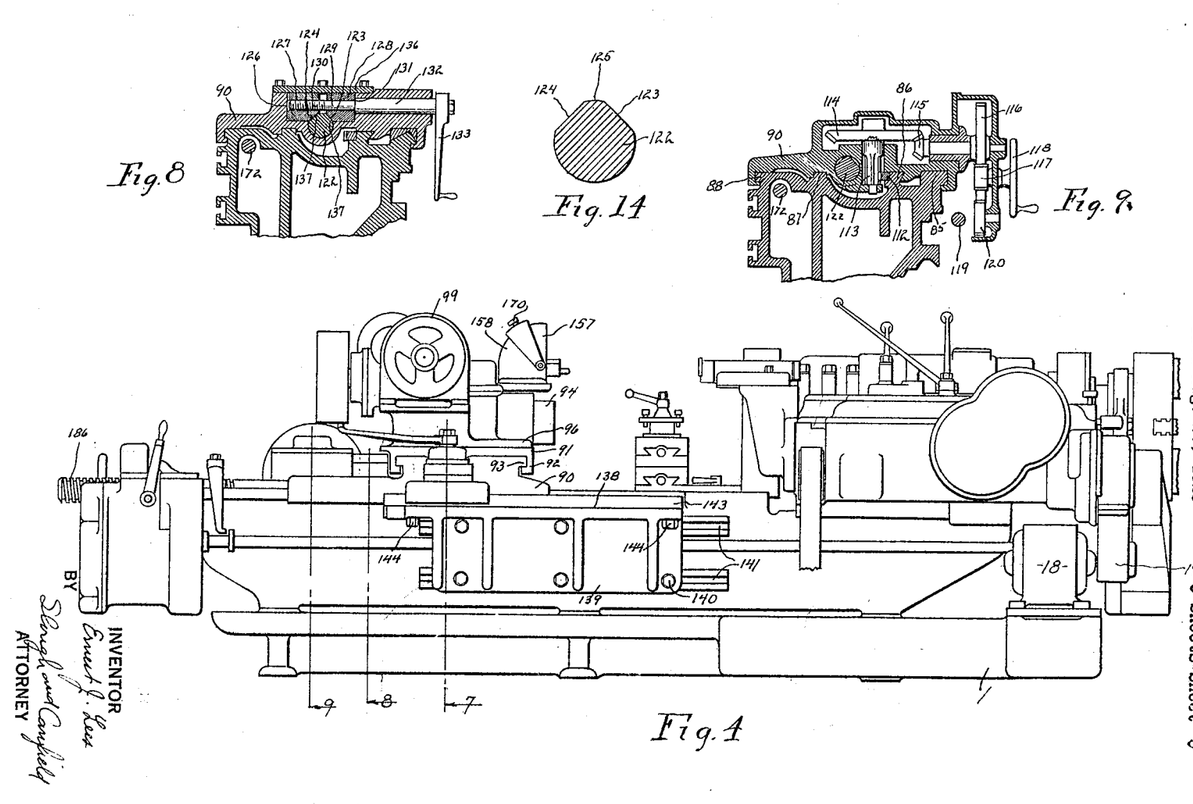
Fig. 4 is a rear elevational view of the machine of Fig. 1.
Fig. 7 is a sectional view taken approximately from the plane 7 of Figs. 1, 4 and 5.
Fig. 8 is a partial sectional view taken from the plane 8 of Figs. 1, 4 and 5.
Fig. 14 is a transverse sectional view of a push and pull bar which I employ for giving lead movement to a tool carrying slide.

I have shown at 1 the main bed of the machine. Mounted on the bed, and indicated generally at 6 in Figs. 1 and 4, is a work head provided with a hollow work spindle 7 rotatable in a bearing housing 8 and equipped at its opposite longitudinal ends respectively with a hand operable work gripping chuck 9 and a pneumatic work gripping chuck 10. The work to be operated on, which may be solid bars, tubes, pipe or the like, may be passed through the bore of the work spindle and gripped by the chuck 9 and if long enough also by the chuck 10.

Figure 10:
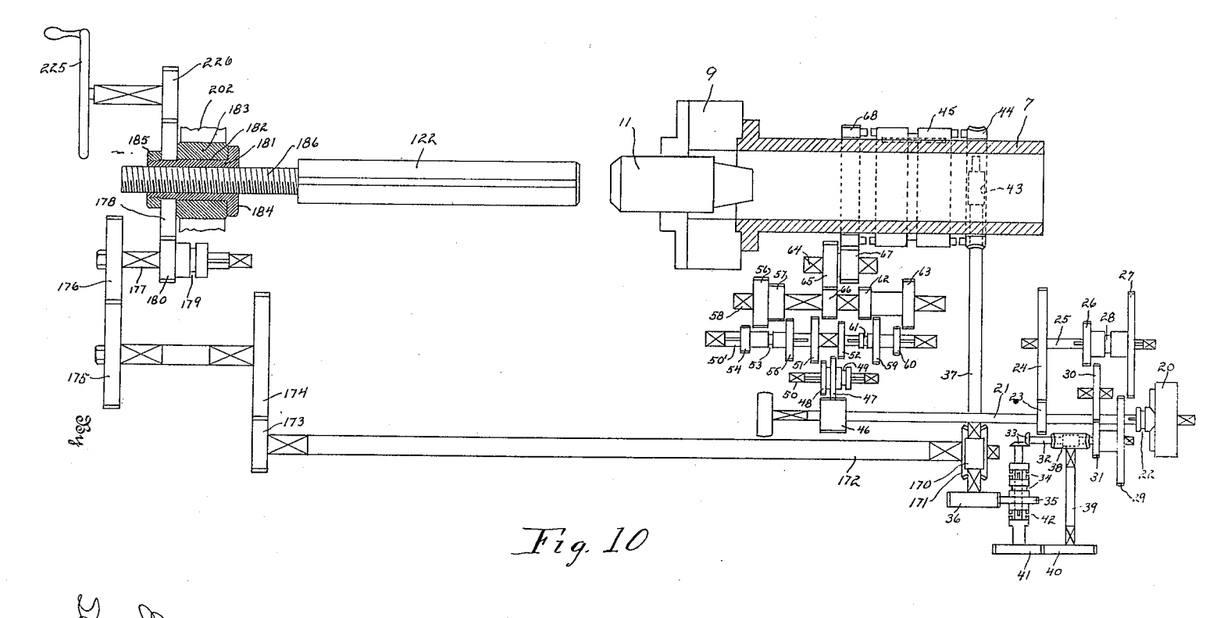
Fig. 10 is a diagrammatic view of a part of the power transmission mechanism of the machine of my invention and arranged approximately as viewed from above in Fig. 4.

In the diagrammatic view, Fig. 10, in which the parts are arranged, as if viewed from above in Fig. 4, the hollow work spindle is indicated at 7 and a relatively short work piece 11 is shown gripped in the diagrammatically represented chuck 9. In Fig. 1 a work piece 17 is shown. The chucks 9 and 10 may be of any known or suitable form of construction and constitute no essential part of my present invention.

The radially movable chuck jaws 12 of the chuck 9 are illustrated as operable by a plurality of screws 13 and the radially movable chuck jaws 14 of the chuck 10 may be operated by a pneumatic head 15 energized by compressed air connected therewith by air ducts 16 under suitable manual control.

To rotate the work spindle and the work piece in the chuck 9, and at a desired speed, any suitable or well known means may be employed.

Figure 2:
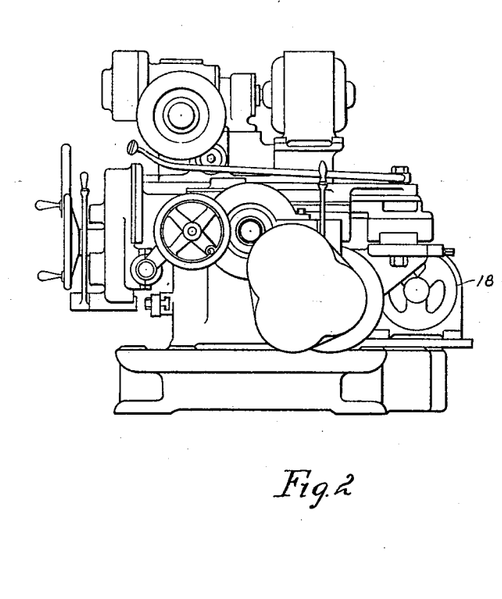
Fig. 2 is an end elevational view of the machine of Fig. 1 taken from the right end thereof.
Figure 3:
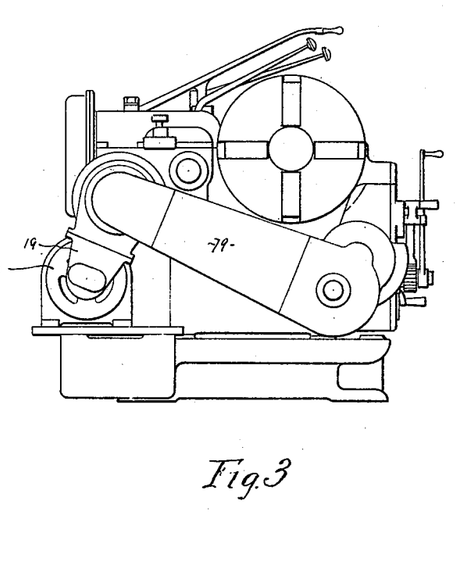
Fig. 3 is an end elevational view of the machine of Fig. 1 taken from the left end thereof.

In the embodiment of my invention illustrated, power is supplied by a motor 18, Figs. 2, 3 and 4 mounted on the bed of the machine. Power from the motor to rotatively drive the work spindle 7 is transmitted by a chain or like means concealed in the housing 19 to and through a system of gearing and clutches for engaging and disengaging and changing the speed ratios of the gears.

This transmission mechanism in the elevational views of the machine, Figs. 1 to 4 inclusive, is concealed in the housings indicated on the right end of the machine as viewed in Fig. 4. These power transmission connections, however, are indicated diagrammatically in Fig. 10. In view of the development of this art, it is believed that the following brief description thereof will be sufficient.

The motor driven wheel 20 is connected to a driving shaft 21 through a clutch 22. By gears 23 and 24 a counter-shaft 25 is driven. Gears 26 and 27 selected by a shifter 28 may selectively drive a gear 29 at high speed or, through an intermediate gear 30, may drive a gear 31 at low speed and in the reverse direction and thus driving in alternate directions and at high and low speeds a shaft 32.

From the shaft 32, which thus has two speeds and two directions, power may be taken through the beveled gears 33 and clutch 34, gears 35 and 36 to the shaft 37; or from the shaft 32 power may be taken through the worm and worm gear 38, shaft 39, speed change gears 40 and 41 and clutch 42 to drive the shaft 37.

The shaft 37 drives the work spindle 7 through a worm 43 and a worm wheel 44 which may be thrown into and out of driving connection with the spindle 7 by a main clutch 45. Thus, it will be seen that the work spindle may be driven at high speed in one direction and at low speed in the other direction and that these speeds may be adjustably varied, and that all the speeds of the work spindle may be made relatively slow and suitable for a thread milling operation which may be performed on the machine. For rotating the work spindle 7 at generally higher speeds, and in one direction, the following drive is provided.

The power shaft 21 by means of a gear 46 drives a first intermediate shaft 50 by a gear 47. By means of the gear 47 and a gear 48 and a shifter 49, a second intermediate shaft 50' may be driven alternately by gears 51 or 52 thereon. In either case, by means of a shifter 53 and selective gears 54 and 55 engageable with gears 56 and 57, a third intermediate shaft 58 may be driven; or the shaft 58 may be driven through other selected gears 59 or 60 by operating a shifter 61 to engage said gears with gears 62 or 63 on the shaft 58. In either case, a fourth intermediate shaft 64 may be driven by a gear 65 thereon and a gear 66 on the shaft 58. By means of a gear 67 on the shaft 64, the gear 68 on the work spindle 7 may be driven and by means of the main clutch 45, the gear 68 may be connected to the work spindle 7 to drive it.

It will thus be seen that by means of the gear 68 and its connection, the work spindle 7 may be driven at a great variety of speeds for a turning or facing operation, which may be performed on the machine.

Figure 6:
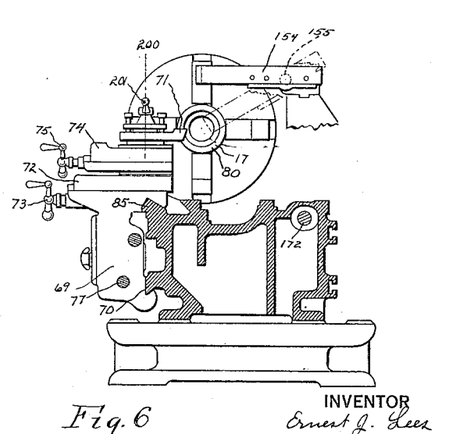
Fig. 6 is a view taken from the plane 6 of Fig. 1, with parts back of the section plane omitted for simplicity.

For performing facing or turning operations on the machine, the mechanism which I provide includes many of the essentials of power driven lathes of known construction. As illustrated in Fig. 6, an apron 69 is mounted on upper and lower ways 70 and 85 disposed longitudinally of the bed of the machine and substantially parallel to the axis of the work spindle 7. Upon the apron may be supported a cutting tool 71.

By means of a transversely guided carriage 72 propelled by a handle 73 and screw, not shown, and by means of a carriage 74 upon which the tool is mounted and which is movable both transversely of the machine by an operating handle 75 and screw, not shown, and adjustably rotatable on a vertical axis 200 and adapted to be locked in any adjusted position by a lever nut 201, the tool 71 may be adjustably positioned relative to a rotating work piece such as the piece 17 in Fig. 1, in any desired position to perform thereon an end facing operation, or a turning operation or other lathe operation.

The means referred to for positionally adjusting the tool 71 are here meagerly described, but it is believed that these parts as illustrated in the drawings will be recognized by those skilled in the art and no further description is required.

To give lead movement to the apron 69 along the ways 70 and 85, the hand wheel 76 may be operated or the apron may be lead by power from a shaft 77 driven through suitable gearing and clutches in the housing 78, which are driven in a manner, not shown, from a cross chain in the housing 79, Fig. 3, driven from the motor 18.

It is believed that this brief description will be sufficient for the lathe apron 69 and the tool 71 movable therewith, and thereon, inasmuch as these parts are well known in connection with lathes generally, and thus far considered form no essential part of my invention.

In connection with a thread milling operation, which may be performed on the machine and which will be described later, it is sometimes desirable to perform a facing operation to provide on a work piece a shoulder or end face such as is indicated at 80 in Fig. 11 or at 81 in Fig. 12. It thus becomes necessary to coordinate the operation formed by the lathe tool 71 with the thread milling operation and for this purpose, I provide a stop, preferably on the bed of the machine, one form of which is indicated at 82, Fig. 1, for stopping the lead movement of the apron 69, and for thus accurately limiting and determining the cut of the lathe tool 71 in the axial direction of the work piece.

The stop 82 as indicated, is preferably of clamp form secured to the way 85 of the machine by a set screw 83, but other positions for the stop and other means for securing it to the bed of the machine may be employed. Furthermore, if desired, graduations may be provided on the way or elsewhere adjacent the stop 82 to preselect its position on the bed.

In operation, one characteristic use of the stop 82 is as follows: Having in mind the shoulder or end face to be produced on the successive work pieces by the tool 71, the tool is set with its cutting edge in such position that by feeding it radially toward the work it will be fed into the work and cut the desired face or shoulder thereon. To perform this operation, the apron is first lead, as by hand, until it is stopped by the stop 82 and when in this position the tool is fed as above described. Another use of the stop 82 is to first move the tool transversely of the work. It then may be led into the work by lead movement of the apron to produce the desired end face or shoulder thereon, and to lead the tool the apron is given lead movement until it is stopped on the stop 82. Other modes and sequences of operation may be employed but in any case it will be observed that the shoulder or end face produced on successive work pieces will have a predetermined positional relation to some imaginary transverse reference plane on the bed of the machine.

Besides the lathe tool and its functions, just described, the machine is provided with a rotary tool for performing such operations as thread milling, and the mechanism for bringing the tool into working relation to the work piece and the control mechanism thereof will now be described.

Mounted for longitudinal reciprocatory movement on ways 85, 86, 87 and 88 is a tool carriage indicated generally at 89, in Fig. 1. The carriage is provided with a longitudinal slide 90, supported on the ways referred to. Mounted on the longitudinal slide is a transverse slide 91 guided for movement on the longitudinal slide by suitable guides 92 on the slide 91 and ways 93 on the longitudinal slide. Supported on the transverse slide 91 is a rotary tool spindle 94 in which may be secured a tool 95 which in the form shown and described is a rotary cutting tool of the multi-ring type.

The tool spindle 94 is rotatably mounted in a tool spindle head 96 supported on the transverse slide 91 and adjustable thereon in a horizontal plane to vary the direction of the tool spindle axis. The tool spindle head may be guided, in its adjusting movement in any suitable manner, but I prefer to swing it on a horizontal plane around a vertical axis and in connection with such movement, I provide an arcuate slot or slots 97 and clamping bolt or bolts 98 therein for securing it in any adjusted position on the slide 91.

Constructed as a unit with the tool spindle head 96 is a tool driving motor 99 connected by gears including speed change gears concealed in the housing 100 to the tool spindle to drive it and a fly wheel 101 being associated with the drive for the usual purposes.

Figure 5:
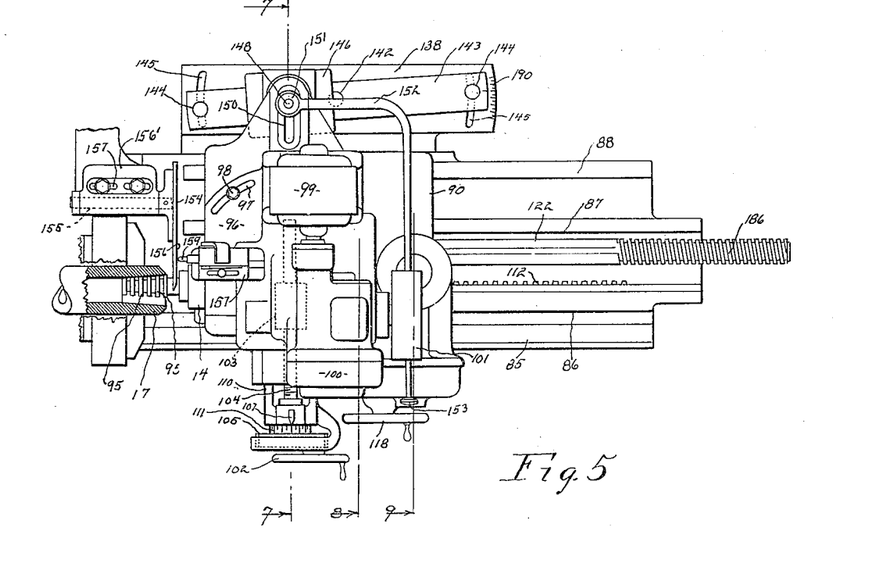
Fig. 5 is a top plan view of a part of the machine of Fig. 1, with portions thereof omitted for simplicity.

The transverse slide 91 may be propelled on the ways 92—93 to position the tool transversely or to feed it relative to the work by means of a threaded nut element 103 depending from the carriage body, Figs. 5 and 7, and a screw 104 threaded therewith. The screw 104 may be turned by a gear 105 connected therewith which in turn is connected to a hand wheel 102 by a pinion 106 on the hand wheel meshed with the gear 105.

The screw 104 is anchored against longitudinal movement by a collar 107 and a gear hub 108 on the gear 105 abutting upon the ends of a bearing 109. The bearing 109 is formed on one end of a rectangular bar 110 extending transversely across the machine and disposed between the slides 90 and 91 and movable relative thereto.

Thus, the slide 91 may be moved transversely relative to the bar 110 in adjusting its position by the hand wheel 102 and the bar 110 may move transversely relative to the slide 90 in unison with the slide 91 when the latter is guided to move simultaneously transversely and longitudinally by taper cutting guide elements, to be described.

A graduated scale 111 may be provided on the gear hub 108 and in cooperation with an index pointer 107 on the bar 110 may be employed to accurately move the slide 91 to accurately feed or position the tool 95 transversely relative to the work.

The longitudinal slide 90 may be propelled or led along the ways 85 to 88 by means of a longitudinal rack 112, Figs. 5 and 9 mounted on the bed of the machine and by means of a pinion 113 mounted in the slide 90 for rotation on a vertical axis. To rotate the pinion 113 and thus propel the slide, a bevel gear 114 is secured to the pinion 113 and meshed with a bevel pinion 115 adapted to be rotatably driven by a spur gear 116 meshed with a spur pinion 117 connected to a hand wheel 118. Thus, by turning the hand wheel in either direction, the slide 90 may be propelled along the ways in either direction.

Provision is also made for rotating the spur gear 116 by power to propel the slide by power when desired and comprises the power driven shaft 119, Figs. 1 and 9 disposed along the bed of the machine in the direction of movement of the slide and adapted to be drivingly connected to a spur gear 120 meshed with the gear 116 upon the movement of a hand lever 121, Fig. 1; and inasmuch as the engageable and disengageable clutch connections for such purposes are well known in the art and constitute no essential part of my invention, the connections between the lever 121, shaft 119 and gear 120 have been omitted for simplicity.

When the operation of thread milling, to be described, is performed, provision is made to lead the slide 90 longitudinally on its ways by a push and pull bar 122 and mechanism for moving the bar longitudinally in either direction, which will presently be described. The slide 90 may be rigidly clutched or gripped to the bar 122 in any position of the slide along the ways, so that it may be propelled by the bar 122 and by the following mechanism illustrated in Fig. 8.

As shown on that figure and as shown separately in Fig. 14, the cross-sectional shape of the bar 122 is circular in the lower half or more, but in the upper half is planed off longitudinally to provide two clutch gripping faces 123 and 124, leaving a small flat or circular face 125 on the upper medial portion. The upper side of the bar is thus rendered wedge shaped in cross-section.

As shown in Fig. 8, the slide 90 is provided with an upwardly opening box 126 in which is fitted a pair of clutch jaws 127 and 128, bored out on a horizontal axis to receive a stem 129 which is threaded as at 130 into the jaw 127 and has a shoulder 131 at which the stem 129 joins an operating shaft 132 terminating outwardly in a lever 133. The jaws 127 and 128 are thus guided by the box 126 to have a limited axial movement relative to each other, and by giving suitable transverse shape to the jaws and the box the transverse bars may be prevented from rotation on the stem axis.

The upper open end of the box is closed by a plate 136. The lower inner opposing faces 137 of the jaws 127 and 128 coincide with the faces 123 and 124 of the bar 122. In operation, when the lever 135 is turned, the screw 130 turns and draws the jaws 127 and 128 toward each other, the plate 136 preventing their riding upwardly on the bar 122 and therefore, causing the gripping faces 137 to grip the bar and lock it rigidly to the slide 90.

During movement of the slide 90 longitudinally by either of the means referred to, the transverse slide 91 may be concurrently moved transversely to cause the tool to follow a path at an angle to the axis of the work for any purpose such as to operate upon conical surfaces of a work piece. For this purpose, the following means is provided.

On the rear side of the bed, Figs. 4, 5 and 7, is bolted a horizontally disposed bracket 138 by means of a vertical leg of the bracket 139, T-bolts 140 passing therethrough and having heads in horizontal T-slots 141 on the bed. On the bracket 138 is bolted, by a center bolt 142, a taper bar 143, which may be adjustably rocked around the bolt 142 and locked in any adjusted position by bolts 144—144 passing through the bar 143 and through circular slots 145 in the bracket.

A rectangular taper slide 146, having a downwardly open groove straddling and slidably fitting the bar 143, is adapted to be reciprocated on the bar 143. At the center of the slide 146 is an upwardly projecting circular boss 147 fitting into a corresponding circular bearing in the bar 110, hereinbefore described.

Passing upwardly through the center of the taper slide 146 is a lock bolt 148 having a head 149 engaging the slide 146 and at its upper end projecting upwardly through the bar 110 and on through an elongated slot 150 in the transverse slide 91. At its upper extreme end, the bolt is threaded into a head 151 which spans the slot 150 and rests upon the side edges of the slot. The head 151 may be turned on the threads of the bolt 148 by a lever 152 which passes around and over the slide and terminates at the opposite side or front of the machine in a handle 153.

When the handle 153 is moved in one direction, say, to the right, Fig. 1 or 5, the head 151 will be loosened on the bolt 148 and then by means of the hand wheel 102, the transverse slide 91 may be positioned transversely. Then by moving the handle 153 in the other direction, the head 151 may be tightened and this will, by means of the bolt 148 clamp rigidly together the transverse slide 91 (in which the slot 150 is formed), the bar 110 and the taper slide 146, so that these parts become substantially a rigid unitary structure.

Subsequently, longitudinal movement of the main slide 90 will cause the taper slide 146 to react upon the taper bar 143 and, due to the angularly adjusted position of the bar 143, will give to the slide 91 a concurrent transverse movement, the combined longitudinal and transverse movements thus giving to the tool 95 on the slide 91 a movement on an angular line parallel to the bar 143.

The above described feature of locking together the transverse slide 91, the bar 110 and the taper slide 146, so that these parts move in unison independently of the intermediate adjustable screw and thread connection by which the position of the slide 91 is adjusted to thus eliminate all lost motion or back lash intermediate these parts constitutes one of the essential features of my invention.

To accurately position the slide 90 longitudinally on the ways to accurately position the tool 95 relative to the work in the axial direction, for a purpose to be described, the following means is provided.

Mounted on the work head and therefore stationary with respect to the bed, is a gage bar 154 having a longitudinal horizontally disposed rotational bearing 155. The bar 154 is preferably provided with a planular face 156, which is thus movable in a transverse plane on the machine. The longitudinal position of the face 156 may be adjusted by longitudinally adjusting the support 156', Fig. 5, for the bearing 155, adjustment slots 157—157 being provided in the support 156' for this purpose.

Figure 13:
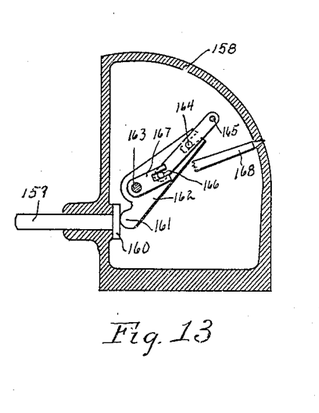
Fig. 13 is a sectional elevational view of a micrometer gaging device shown in elevation in Figs. 1 and 4 and drawn to a larger scale and with parts omitted for simplification.

Adapted to cooperate with the bar 154 is a micrometer gage 157, shown in Figs. 1, 4 and 5, and indicated in simplified form in Fig. 13. The gage 157 comprises a main housing 158 out of which projects a plunger 159 in a longitudinal horizontal direction at a level somewhat above the axis of the work spindle, and preferably at the level of the bearing 155 of the bar 154.

Internally of the housing 158, as indicated in Fig. 13, a head 160 of the plunger engages a finger 161 of a lever 162 pivoted on a stationary pivot 163. The free end of the lever 163 has a slot embracing a pin 164 on a lever pivoted at one end on a stationary pivot 165, the other end of which carries a pin 166 embraced by a slot in the free end of a lever 167, also pivoted on the pivot 163.

Rigidly connected on the lever 167 is a dial hand or pointer 168. Upon movement of the plunger 159 inwardly, the levers are rocked around their pivots 163 and 165 in a well known manner and the pointer 168 will be moved around the pivot 167 greatly magnifying the movements of the plunger 159. Any suitable means may be employed to return the parts to the normal position shown in Fig. 13. Movement of the dial hand 168 may be indicated on a graduated scale 169 on the outside of the housing, Fig. 1, the position of the scale being adjustable on the housing by a set screw 170. The gage housing 158 is mounted on and movable with the transverse slide 91. The particular magnifying mechanism illustrated in Fig. 13 is not essential to my invention, since other suitable or known mechanisms may be employed to magnify the movement of the plunger 159.

In the operation of the machine, to be more fully described, the work piece to be operated on may be positioned relative to the gage bar 154 and the plunger 159 may then be brought into contact with the bar face 156 by longitudinal movement of the slide 90 and the plunger 159 will be pushed inwardly to cause the pointer 168 to indicate a predetermined reading on the scale 169 and thus a predetermined position for the tool 95 may be indicated, and thus the tool 95 may be, at successive operations, returned to a predetermined position on the machine relative to a preselected transverse reference plane on the machine.

The bar 154 may, by any suitable friction or locking means be held in any adjustably rotated position. When it is disposed substantially horizontally, the plunger 159, because it is located approximately at the level of the bearing 155 of the bar will engage the bar to indicate the position of the tool at all positions of the tool transversely of the machine, that is to say, the tool may be positioned longitudinally of the machine not only with respect to the transverse reference plane on the machine (the plane in which the bar 154 swings) but may be referred to the plane at any point in a horizontal line of the plane. It will be understood, of course, that after positioning the tool 95, the gauge bar 154 may be rocked upwardly out of the way.

To propel longitudinally the bar 122, as above referred to, the following means is provided, shown generally in Figs. 1 to 4 inclusive and indicated diagrammatically in Fig. 10.

Referring to Fig. 10, the rotary movement of the shaft 37 which, as above described, rotates the work spindle 7, also transmits movement through a worm 170 and worm gear 171 to a shaft 172. The shaft 172 runs the full length of the machine through the bed thereof, as shown in Figs. 6 to 9 inclusive, and at the left end of the machine, as viewed in Figs. 4 and 10, carries a gear 173 meshed with a gear 174 to drive meshed speed change gears 175 and 176 and a transmission shaft 177.

The shaft 177 may be connected to or disconnected from a gear 178 by a sliding clutch 179 and gear 180 on the shaft 177. The gear 178 is rigidly connected to a nut 181 having an external cylindrical rotational bearing surface 182 mounted rotatably in a bearing 183 secured to the main bed of the machine by the part broken away at 202.

The nut 181 is anchored against axial movement by a flange 184 on one end of the nut engaging one end of the bearing 183 and by a clamp nut 185 threaded on the other end of the nut 181 between which and the other end of the bearing 183 the gear 178 is clamped.

The adjacent end of the push and pull bar 122 is threaded, as at 186, Figs. 4, 5 and 10 and meshed with the internal threads of the nut 181. By this arrangement, rotation of the gear 178 rotates the anchored nut 181 and the nut rotating on the thread 186 propels the bar 122 longitudinally.

It will thus be observed, particularly by reference to Fig. 10, that the rotary movement of the work spindle 7, and the longitudinal movement of the bar 122 occur at a fixed predetermined relative velocity ratio due to the gearing connections therebetween and that this ratio may be adjusted at will.

In addition to the means for propelling the bar 122 by power as above described, it may be propelled by hand if desired and as occasion may require by means of a hand wheel 225 connected to a gear 226 meshed with the gear 178 (Fig. 10), by first shifting the shifter 179 to disengage the gear 180 and from the gear 178, when the gear 178 may be turned by the hand wheel 225 in either direction to propel the bar 122 in either longitudinal direction.

To accurately determine the rotational position of a work piece in the chuck 9, a graduated scale 187 may be provided on the periphery of the chuck, as shown in Fig. 1, and to cooperate therewith a stationary index pointer 188 may be mounted on the stationary housing of the work head.

The operation of the machine of my invention will be described in connection with the tool operations performed on the work piece 17, illustrated in Figs. 1 and 5 and shown separately in Fig. 11.

The work piece is projected out of the chuck 9 a suitable distance, Figs. 1 and 5, which, if desired, may be roughly determined by rocking the gage bar 154 to the broken line position indicated in Figs. 1 and 6, this being an auxiliary function of the gage bar which may or may not be utilized, as desired.

After clamping the work piece in the chuck, in this position, the lathe tool 71, Figs. 1 and 6, which has previously been positioned on the apron 69 at the correct cutting angle, is moved, by moving the apron, to bring it into engagement with the end of the work piece to face off the end face 80. The lead movement of the apron at this operation is stopped by the stop 82, which has been accurately set. Thus, the end face 80 is positionally related to a transverse reference plane of the machine.

To mill the tapering threads 189 to the desired degree of taper, the angle of taper is first determined and the taper bar 143 is set at this angle, by means of graduations 190 on the bracket 138. The hand wheel 102, Figs. 1, 5 and 7, is then turned to position the tool 95 substantially coaxial with the work piece 17, the lever handle 153, Figs. 1, 5 and 7, being first moved to loosen the lock bolt 148, Fig. 7, to permit movement of the slide 91.

The hand wheel 118, Figs. 1, 5 and 9, is then turned to propel the slide 90 and to bring the tool 95 into the bore of the work piece, the position thereof axially in the bore being very accurately determined by the dial hand 168 on the scale 169, the hand being caused to move back and forth over the scale to the desired position by slight back and forth longitudinal movements of the slide 90 with the plunger 159 in engagement with the face 156 of the gage bar 154, as shown in Fig. 5.

It will be noted that the tool is not adjusted to its position by rigidly stopping the entire carriage unit (89 in Fig. 1), but that the carriage and tool may over-travel its final accurate position in either direction, thus gently and without shock and with high accuracy moving the tool to its desired position.

With the axial position of the tool 95 thus determined, the motor 99 may be started to rotate the tool 95, and while rotating the transverse slide 91 is given a transverse feed movement by turning the hand wheel 102, Figs. 5 and 7, to feed the rotating tool to a predetermined depth into the inner wall of the work, the predetermined depth being attained by a predetermined reading for the scale 111 and the index pointer 107, Figs. 5 and 7.

When the tool has thus reached the desired depth, the slide 90 is connected rigidly to the bar 122 by rotating the lever 133 to actuate the clutch mechanism, Fig. 8, to cause the clutch jaws 127 and 128 on the slide 90 to grip the bar 122. The motor 18 is then started or the clutch 22, Fig. 10, engaged to simultaneously start rotation of the work spindle 7 and longitudinal propulsion of the bar 122 in the direction away from the work to withdraw the tool 95 gradually.

The rate of rotation of the work spindle and the rate of lead movement of the tool may be so predeterminedly related by the gear selection and change gear connections, hereinbefore referred to, that the tool is advanced by the lead movement a distance equal to the thread pitch during one revolution of the work spindle, so that the several rings of the multi-ring cutter, all cutting simultaneously, cut the complete conical spiral thread in one revolution of the work piece.

Upon successively repeating the thread milling operation, on successive work pieces, the tool is successively repositioned, as above described, by disengaging the clutch which grips the bar 122 so that the bar 122 on successive operations intermittently moves always in the tool withdrawing direction, the clutch gripping it on successive operations farther and farther from the threaded end.

This mode of operation is an essential part of my invention. If the more obvious mode of operation were employed, namely to propel the bar 122 first in one direction and then in the other to respectively position the tool in the work and then withdraw it during the milling operation, great inaccuracy and a great loss of time would both result due to the great amount of back lash which would be introduced in the train of gear connections by which the bar propelling nut 182 is rotated. But, by my invention, according to which the propelling nut is rotated always in one direction, this back lash is taken up on the first operation and thereafter the reintroduction of the back lash is prevented by continuing to rotate the propelling nut in one direction and propelling bar 122 in one direction. Thus, back lash between the propelling nut and the bar is likewise prevented.

As will be understood, after a certain number of operations and longitudinal movement of the bar 122 in one direction, the length thereof will have been used up and a fresh beginning must be made, and this may be done by rotating the nut 181 in the reverse direction and propelling the bar 122 back to a starting position. This operation may be performed at a rapid rate by the gear connections shown, particularly in Fig. 10, and if desired, without rotating the work spindle 7.

It is, therefore, one of the essential features of my invention that the nut 181 may be rotated at a high rate of speed in the return direction. Its high speed rotation accomplishes two results, namely the prompt return of the bar just mentioned and also the rapid removal of the back lash accumulated in the gearing connections by which the nut is driven. It will be understood that the rate at which the nut 181 rotates during the thread milling operation is very slow and at a great reduction of speed by reduction gearing and that it would be impractical to reverse the rotation of the nut between successive thread milling operations, because the attendant back lash in the reduction gearing would have to be taken up anew on each reversal of the nut, and in some cases this would occasion a lost time interval of many minutes. But by means of my invention, the nut 181 may be slowly rotated always in one direction for repeated thread milling operations and at a low speed; and at the end of the series of thread milling operations may be rotated at a high rate of speed to return the bar, and the unavoidable back lash referred to causes no loss of time or other disadvantage in the operation of the machine.

If desired, of course, the nut 181 may be rotated by hand as hereinbefore described to return the bar instead of by the power means.

Figures 7, 12:
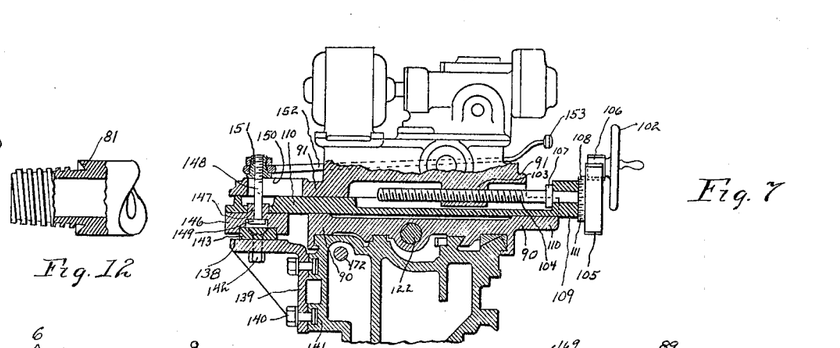
Fig. 12 is a view similar to Fig. 11 showing other operations which may be performed.
Figure 11:
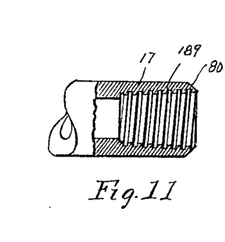
Fig. 11 is a fragmentary sectional view of a work piece illustrating operations which may be performed by the machine of Figs. 1 to 10.

It will be understood that a taper threaded work piece, such as shown in Fig. 11, is intended to be screwed onto a mating piece, such as shown in Fig. 12 with the end face 80 abutting against a corresponding shoulder 81. Because the thread follows a conical form, the beginning and ending of the thread must be accurately positioned axially of the cone, otherwise the two mating pieces will screw up to a tight thread position before the face 80 and shoulder 81 engage or vice versa.

I find, however, that with the machine of my invention, the face 80 and shoulder 81 may be caused to come into tight mutual abutment exactly concurrently with the tightening of the two conical threads (male and female) with each other. The high degree of accuracy necessary is effected by accurately relating the face 80 on the work piece with respect to a reference plane on the machine and subsequently accurately relating the conical thread axially with respect to the same plane or a plane parallel therewith at a predetermined distance therefrom by means of the micrometer gaging device comprising or including the gauge bar 154 and the tool positioning scale 169.

If, at any time, it be desired to retrace or recut or chase a thread which has been cut, it may be desirable to accurately relocate the tool in the work. This may be done with the highest degree of accuracy on the machine of my invention by means of readings previously taken on the scale 187 in connection with the index pointer 188, which indicated the original rotational position of the work piece and on the scale 169 which indicates longitudinal position of the tool and on the scale 111 which indicated the transverse position of the tool.

It will be apparent that the advantages of accurately gaging the position of the rotary tool in the work before starting the thread milling operation, may be utilized when cutting tapering threads when the abutting end face 80 is not desired to be used.

The operation of thread milling hereinbefore described is performed by lead movement of the tool 95 in a withdrawing direction away from the work. It is one of the important advantages of my invention that the thread milling tool may be very accurately positioned longitudinally for thread milling operation in which the tool is led longitudinally into or toward the work. In this connection, the longitudinal position of the tool 95 may be determined by the scale 169 as in the other case, by abutting the plunger 159 upon the gauge bar 154 and then the gauge bar may be rotated upwardly out of the path of the plunger 159 and the gauge device 157 as a whole so that the tool may be led toward or into the work from its starting position. In other words, the tool is accurately positioned by movement in one direction and operated by continued movement in the same direction.

In connection with the retracing or recutting or chasing a thread which has been cut or partially cut as above referred to, my invention has features of particular advantage when it is desired or necessary to move the tool carriage to a distance from the work. In some cases after the threading operation has been performed, it is customary or desirable to insert a gauge such as a threaded gauge into the thread as cut to test its accuracy and to make room for inserting the gauge into or upon the work, the tool carriage 89 (Fig. 1) may have to be removed to a distance on the ways to get the tool 95 out of the way. This may be done by disengaging the clutch connection between the lead bar 122 and tool carriage 89 (shown in Fig. 8) and freely moving the carriage away either by the hand wheel 118 or by the power shaft 119. Then after inspecting the work by means of the gauge, the tool may be re-set in the thread being cut to re-cut it or the like; and, notwithstanding the fact that the highly essential harmony between the rotary movement of the work and the longitudinal lead movement of the tool has been broken by disengaging the clutch as above referred to, the tool may be re-set in the work and at its former position to a high degree of accuracy by means of the gauge scales 187, 111 and 169 referred to and upon reengaging the clutch between the carriage and the lead bar the rotary movement and the lead movement may be resumed, and will be in the same harmony as before and the tool may be "chased" through the thread already cut to finish it, or may be correctively readjusted to bring the thread more perfectly into conformity with the thread gauge, by which it was tested. The provision by which the tool may be entirely disconnected from the means for giving the lead movement, and by which it may be moved independently thereof, as for example to inspect the work, and by which it may be again restored to working position, and its connection with the lead getting means reestablished without losing its harmonious relation to the work, and whereby it may accurately repeat or resume its thread cutting operation constitutes an essential feature of my invention.

While I have described the operation of my machine in connection with the thread milling of a conical thread of the internal or female type, as illustrated in Fig. 11, it will be understood that a tapering thread and a shoulder 81 may be produced on a work piece, as illustrated in Fig. 12 by the same general mode of operation and to the same high degree of accuracy.

Also while I have described my invention as particularly applicable to milling tapering or conical threads, it will be apparent that the advantages to be gained from the embodiment of the several features of my invention may be had in performing other and various operations on various kinds and classes of work pieces, and tapering and nontapering. Particularly, in this respect, I have illustrated and described my invention solely in connection with a tapering tool of the multi-ring type, but those skilled in this art will, without further illustration or description, clearly understand the use of my invention in its various phases with respect to a multi-ring cylindrical cutter or a single ring cutter, and my invention, therefore, is not restricted to the use of a particular type of tool.

I have shown and described my invention as embodied in a machine in which the work head is stationary on the bed of the machine and the tool carriage generally is movable relative thereto. The various features of my invention may be embodied to equal advantage in a machine of the type in which the tool is mounted on a stationary head on the bed of the machine and in which the work is mounted in a movable carriage, the essential requisite being to have the tool and the work movable relative to each other. Similarly, although I have shown the tool adjusting gage device as mounted and movable with the tool support and a stationary stop cooperating therewith as stationarily mounted on the work head, it will be apparent that in some applications of my invention, the position of these parts may be reversed.

Besides the foregoing indicated changes and modifications which may be made in the foregoing embodiment and description of my invention, other and numerous changes and modifications may be made without departing from the spirit of my invention or sacrificing its advantages.

I claim:

1. In a machine of the class described, a support for a work piece, a tool support, a tool on the support, one of said supports being movable on the machine, means for setting up relative movement between a work piece on the work support and the tool support by movement of the movable support on the machine, means for accurately positioning the tool in working position relative to a work piece on the work support, said means including a stop associated with one of the supports, and a gauge device associated with the other of the supports, an indicator on the gauge device, an indicator operating element of the gauge device adapted to be brought into engagement with the stop upon movement of the movable support, and upon continued movement of the movable support adapted to remain in engagement with the stop and to thereupon indicate upon the gauge the position of the tool.

2. In a machine of the class described, a support for a work piece, a tool support, a tool on the support, one of said supports being movable on the machine, means for setting up relative movement between a work piece on the work support and the tool support by movement of the movable support on the machine, means for accurately positioning the tool in working position relative to a work piece on the work support, said means including a stop associated with one of the supports, and a gauge device associated with the other of the supports, an indicator on the gauge device, an indicator operating element of the gauge device adapted to be brought into engagement with the stop by movement of the movable support in one direction and upon subsequent movement of the movable support in either direction adapted to remain in engagement with the said stop and to indicate on the gauge device the position of the tool at, short of, or beyond a preselected position.

3. In a machine of the class described, a support for a work piece, a movable tool carriage, a tool on the carriage, means for moving the tool carriage to move the tool into working position relative to a work piece on the work support, means for accurately locating the tool, said locating means including a stop associated with the work support, a gauge device on the tool carriage movable therewith, a position indicator on the gauge device, an indicator operating element of the gauge device, adapted to be brought into engagement with the stop by movement of the tool carriage and adapted to remain in contact with the stop during continued movement and reverse movement of the tool carriage, to thereupon indicate on the gauge positions of the tool beyond, at or short of a preselected position.

4. In a machine of the class described, a support for a work piece, a first tool support, a first tool on the first support, a second tool support, a second tool on the second support, means for setting up relative rotary movement between a work piece on the work support and the first tool support to effect a relative operating movement between the first tool and the work piece, stop means for the first tool support to determine a preselected position between the first tool and the work piece relatively longitudinally, to thereby provide a worked portion on the work piece having a predetermined relation to a fixed transverse reference plane on the machine, means for setting up relative rotary movement between the work piece and the second tool and concurrently a longitudinal relative movement to effect a thread cutting relative movement between the second tool and the work piece, means for positioning the second tool longitudinally with respect to the work piece to cause the thread cutting operation to begin at a point having a predetermined positional relation longitudinally with respect to the said reference plane, said positioning means including a tool position indicating gauge associated with the second tool support and fixed stop associated with the work support, the gauge being adapted to indicate tool positions by engagement with the stop upon relative movement between the tool support and work support.

5. In a machine of the class described, a rotary work spindle adapted to support a work piece, a first tool support, a tool on the first tool support, means for rotating the tool spindle, means for moving the tool support longitudinally of the work and transversely thereof to position the tool relative to the work for performing the operation thereon, stop means for determining the longitudinal position of the tool to establish on the work piece an operated portion having a predetermined positional relation to a transverse reference plane on the machine, a second tool support, a second tool on the second tool support, means for moving the second tool support with a lead movement concurrently with the rotation of the work spindle to set up a thread cutting relative movement between the second tool and the work piece, means for positioning the second tool longitudinally of the work piece to cause the thread to start at a predetermined point having a predetermined longitudinal position relative to the said reference plane, said means including a stop on the work support, a gauge device on the second tool support, a gauge operating element of the device adapted to be brought into engagement with the stop upon movement of the second tool support and adapted to permit continued movement of the second tool support while engaged with the stop whereby the gauge device may indicate positions of the tool beyond, at and short of a preselected tool position.

6. In a device for indicating the position of a tool relative to a work piece on a machine tool, a work support, a stationary stop associated with the work support, a tool support, a tool position indicating gauge device associated with the tool support, an indicator element of the gauge device adapted to be moved into engagement with the stop upon adjustably moving the tool support and to indicate on the device positions of the tool at, beyond and short of a preselected tool position upon continued movement of the tool support toward and from the work support.

7. In a machine of the class described, a tool support, a tool on the support, means for moving the tool longitudinally and transversely of the machine to adjustably position it, means for indicating positions of the tool, said means comprising a gauge stop element movable in a transverse plane on the machine, and a gauge device associated with the tool support and adapted to be moved longitudinally to engage the stop element at any transverse position of the tool.

8. In a machine of the class described, a tool support, a tool on the support, means for moving the tool longitudinally and transversely of the machine to adjustably position it, means for indicating positions of the tool, said means comprising a gauge stop element movable in a tranverse plane on the machine, and a gauge device associated with the tool support and adapted to be moved longitudinally to engage the stop element at any transverse position of the tool, and the stop gauge device being adapted to be moved out of the longitudinal path of the gauge device.

9. In a machine tool, the combination of a work support, a tool support, a tool on the tool support, means for positioning the tool relative to a work piece on the work support to position it for operation thereon, said means including a gauge stop provided with a planular surface in a transverse plane on the machine, and a gauge device on the tool support movable therewith and operable by being moved into engagement with the surface of the stop, the stop being mounted for movement to move the said surface in said plane and out of the path of the gauge device.

10. In a machine of the class described, a rotary work spindle, a tool support, a tool on the support, means for rotating the work spindle and concurrently setting up a lead movement of the tool support to effect a thread cutting operation by the tool upon a work piece mounted on the work spindle, means for adjustably positioning the tool longitudinally with respect to the work piece at the beginning of the lead movement, said means comprising a gauge stop provided with a planular surface in a transverse plane on the machine, an indicating gauge device on the tool support movable therewith, a gauge operating element on the device adapted to be moved by longitudinal movement of the tool support into engagement with the said surface, and adapted by subsequent longitudinal movement of the tool support toward and from the work to indicate positions of the tool at, beyond and short of a preselected position, the stop being mounted for movement out of the longitudinal path of the gauge operating element to permit lead movement of the tool support and tool in the direction toward the work piece.

11. In a machine of the class described, a rotary work spindle, a tool support, a tool on the support, means for rotating the work spindle and concurrently setting up a lead movement of the tool support to effect a thread cutting operation by the tool upon a work piece mounted on the work spindle, means for adjustably positioning the tool longitudinally with respect to the work piece at the beginning of the lead movement, said means comprising a gauge stop provided with a planular surface in a transverse plane on the machine, an indicating gauge device on the tool support movable therewith, a gauge operating element on the device adapted to be moved by longitudinal movement of the tool support into engagement with the said surface, the stop being mounted for movement out of the longitudinal path of the gauge operating element to permit lead movement of the tool support and tool in the direction toward the work piece.

12. In a machine tool having a work support and a tool support, means for rotating one of said parts relative the other, and means for moving one of said parts longitudinally relative the other, said last mentioned means comprising a lead screw keyed to one of said parts and axially movable in respect thereto, gripping means selectively securing said part to said screw, a nut held against axial movement, and means for rotating the nut.

13. In a machine tool having a rotary work spindle and a tool support movable toward and from the spindle, both mounted on a base, a threaded bar associated with said carriage and held against rotation thereby, a releasable gripping means for connecting the carriage to the bar to move axially therewith, a nut journalled in said base and threaded on said bar, and gearing between said work spindle and said nut.

14. A machine tool comprising a base, a rotary work spindle carried thereby, a tool supporting carriage slidably carried by said base, a non-circular lead bar passing through a non-circular opening in said carriage, the end of the lead bar being threaded, a nut threaded on the threaded portion of the lead bar and journalled on the base, and a gripping jaw carried by said carriage and arranged to clamp the same to the lead bar.

15. A machine tool comprising a base, a rotary work spindle carried thereby, a tool supporting carriage slidably carried by said base, a non-circular lead bar passing through a non-circular opening in said carriage, the end of the lead bar being threaded, a nut threaded on the threaded portion of the lead bar and journalled on the base, a gripping jaw carried by said carriage and arranged to clamp the same to the lead bar, and positive driving gearing between the work spindle and the nut.

16. In a machine tool having a rotary work spindle and a tool support movable toward and from the spindle, both mounted on a base, a threaded bar associated with said carriage and held against rotation thereby, a releasable gripping means for connecting the carriage to the bar to move axially therewith, a nut journalled in said base and threaded on said bar, gearing between said work spindle and said nut, and means for moving the tool carriage longitudinally with respect to the lead bar when disengaged therefrom.

17. In a machine tool having a base, a work support, and a tool support carried thereby, means for moving one of said supports longitudinally on said base, a guide carried by the base and angularly adjustable relative the motion of said support, a transversely movable element carried by said support and having one end slidable on said guide, a second transversely movable element carried by said first transversely movable element, and means for clamping said two transversely movable elements together.

18. A machine tool comprising a base, a rotatable work spindle carried thereby, a carriage slidable upon the base in the direction of the axis of said spindle, an element slidable on said carriage transversely of said axis, an angularly adjustable guide carried by the base, the transversely extending element being connected to a follower associated with said guide, a second transversely movable element carried by said first transversely movable element and supporting a tool, and means for detachably connecting said transversely slidable elements together.

19. A machine tool comprising a base, a rotatable work spindle carried thereby, a carriage slidable upon the base in the direction of the axis of said spindle, an element slidable on said carriage transversely of said axis, an angularly adjustable guide carried by the base, the transversely movable element having a follower controlled by said guide, a second transverse movable element carried by said first transversely movable element and supporting a tool, means for detachably connecting said transversely slidable elements together, and means for moving the second transversely movable element relative the first transversely movable element.

20. A machine tool comprising a base, a rotatable work spindle carried thereby, a carriage slidable upon the base in the direction of the axis of said spindle, an element slidable on said carriage transversely of said axis, an angularly adjustable guide carried by the base, the transversely movable element having a follower cooperating with said guide, a second transversely movable element carried by said first transversely movable element and supporting a tool, means for detachably connecting said transversely movable elements together, and threaded means for moving said second transversely movable member with relation to said first transversely movable member.

21. A machine tool comprising a base, a rotatable work spindle carried thereby, a carriage slidable upon the base in the direction of the axis of said spindle, an element slidable on said carriage transversely of said axis, an angularly adjustable guide carried by the base, the transversely movable element being controlled by said guide, a second transversely movable element carried by said first transversely movable element and supporting a tool, means for detachably connecting said transversely movable elements together, means for moving said second transversely movable member with relation to said first transversely movable member comprising a threaded rod journalled in said first transversely movable element and threaded into the said second transversely movable element, and means for rotating said rod.

22. In combination with a machine tool having a rotary work spindle, a tool support, and means for adjusting the position of the tool support axially of the spindle, for feeding the tool transversely the spindle, for rotating the work, and for leading the tool axially of the work, gauge means indicating the original starting angular position of the work spindle.

23. In combination with a machine tool having a rotary work spindle, a tool support, and means for adjusting the position of the tool axially the spindle, for feeding the tool transversely into the work, for rotating the work, and for leading the tool axially of the work, gauge means indicating the original starting longitudinal position of the tool support.

24. In combination with a machine tool having a rotary work spindle, a tool support, and means for adjusting the position of the tool axially the spindle, for feeding the tool transversely into the work, for rotating the work, and for leading the tool axially of the work, gauge means for indicating the original starting transverse position of the tool support.

25. In combination with a machine tool having a rotary work spindle, a tool support, means adjusting the position of the tool axially and transversely the spindle, means for feeding the tool transversely into the work, for rotating the work, and for leading the tool axially of the work, of gauge means for indicating the original position of the tool both longitudinally and transversely.

26. In combination with a machine tool having a rotary work spindle, a tool support, and means for adjusting the position of the tool axially the spindle, for feeding the tool transversely into the work, for rotating the work, and for leading the tool axially of the work, distance-magnifying gauge means indicating the original starting longitudinal position of the tool support.

In testimony whereof I hereunto affix my signature this 6th day of August, 1929.

ERNEST J. LEES.